(12) United States Patent
Braverman

(10) Patent No.: US 7,308,434 B2
(45) Date of Patent: Dec. 11, 2007

(54) ACCOUNT MANAGEMENT TOOL FOR E-BILLING SYSTEM

(75) Inventor: David K. Braverman, Alpharetta, GA (US)

(73) Assignee: Verizon Business Global LLC, Basking Ridge, NJ (US)

( * ) Notice: Subject to any disclaimer, the term of this patent is extended or adjusted under 35 U.S.C. 154(b) by 1336 days.

(21) Appl. No.: 09/823,626

(22) Filed: Mar. 30, 2001

(65) Prior Publication Data

US 2002/0052812 A1 May 2, 2002

Related U.S. Application Data

(60) Provisional application No. 60/193,298, filed on Mar. 30, 2000.

(51) Int. Cl.
*G06F 17/30* (2006.01)
(52) U.S. Cl. .......................................................... 707/1
(58) Field of Classification Search .................... 707/1, 707/2, 200; 705/27, 44, 38; 700/95; 709/101, 709/203; 701/1, 10; 379/67.1
See application file for complete search history.

(56) References Cited

U.S. PATENT DOCUMENTS

| | | | |
|---|---|---|---|
| 5,603,025 A | | 2/1997 | Tabb et al. |
| 5,699,528 A | | 12/1997 | Hogan |
| 5,724,584 A | * | 3/1998 | Peters et al. ................. 709/101 |
| 5,787,416 A | * | 7/1998 | Tabb et al. .................... 707/2 |
| 5,832,460 A | | 11/1998 | Bednar et al. |
| 5,870,473 A | | 2/1999 | Boesch et al. |
| 5,884,284 A | | 3/1999 | Peters et al. |
| 5,884,288 A | | 3/1999 | Chang et al. |
| 5,903,881 A | | 5/1999 | Schrader et al. |
| 5,909,485 A | | 6/1999 | Martin et al. |
| 5,956,700 A | | 9/1999 | Landry |
| 5,963,925 A | | 10/1999 | Kolling et al. |

(Continued)

FOREIGN PATENT DOCUMENTS

| | | |
|---|---|---|
| WO | 98/58339 | 12/1998 |
| WO | 99/13421 | 3/1999 |

OTHER PUBLICATIONS

Electronic Bill Payment/Presentment Business Practices, Council for Electronic Billing and Payment of the NACHA, Jun. 4, 1999, Edition 1.0, pp. 1-28, entire document.

(Continued)

*Primary Examiner*—Etienne Leroux

(57) ABSTRACT

An account management methodology and system for sales representatives of an enterprise employing an e-billing system including a computer system accessible for on-line interactive communication of product and service invoices to users. The account management tool includes a database for storing customer account information including customer invoices, the customer information including information for associating a customer account with a particular sales representative; a mechanism for retrieving from the database a list of all customer accounts associated with the sales representative; and, a device for transmitting a list of customer accounts associated with the sales representative to a sales representative browser device for that sales representative's review. The account management methodology and system includes an e-mail notification feature enabling receipt of email notifying a sales representative that a customer has signed up for (or) has been deleted from e-billing. A sales representative is further provided with the ability to turn off/on this email notification.

34 Claims, 8 Drawing Sheets

U.S. PATENT DOCUMENTS

| | | |
|---|---|---|
| 5,970,476 A | 10/1999 | Fahey |
| 5,978,780 A | 11/1999 | Watson |
| 5,991,750 A * | 11/1999 | Watson ........................ 705/44 |
| 5,995,946 A | 11/1999 | Auzennf et al. |
| 6,047,268 A | 4/2000 | Bartoli et al. |
| 6,052,671 A | 4/2000 | Crooks et al. |
| 6,067,525 A | 5/2000 | Johnson et al. |
| 6,289,322 B1 | 9/2001 | Kitchen et al. |
| 6,496,744 B1 * | 12/2002 | Cook ........................ 700/95 |
| 6,616,458 B1 * | 9/2003 | Walker et al. .............. 434/322 |
| 2001/0018673 A1 * | 8/2001 | Goldband et al. ............ 705/27 |
| 2001/0037297 A1 | 11/2001 | McNair |
| 2001/0047347 A1 * | 11/2001 | Perell et al. .................... 707/1 |
| 2002/0026410 A1 * | 2/2002 | Woloshin et al. ............. 705/38 |
| 2002/0131561 A1 * | 9/2002 | Gifford et al. ............. 379/67.1 |
| 2004/0249766 A1 | 12/2004 | Ganesan et al. |

OTHER PUBLICATIONS

M. Betta, Start Paying Invoice Once, Not Twice, Computerworld, vol. 27, No. 14, Apr. 5, 1993, p. 59, entire document.

Checkfree, First Data and Microsoft Join Forces to Accelerate Billing and Payment Use, Feb. 15, 2000, www.checkfree.com/newsresults/1,5872,649,00.html, 6 pages, entire document.

Intelligent Enterprise, 2, 4, 8(1), Mar. 9, 1999, 2 pages, entire document.

Michaelas et al., "Pay and Save", Accountancy, London, England, Jun. 1999, vol. 123, Iss. 1270, p. 92.

Hayes, H., "E-Forms Learn New Language", Federal Computer Week, Falls Church, Virginia, Feb. 21, 2000, vol. 14, Iss. 4, p. 32.

* cited by examiner

| MCI WorldCom Interact<sup>SM</sup> | *My Interact* | MCI WORLDCOM |

70
- ORDER
- go to »
- home

IDENTIFICATION DATA  You are logged on as: (admin/cs /sales rep/)

| IAT Home | Account List | View Account Invoice | E-mail Notifications | Search |

72

Administration Tool

View Account Invoice

Account Name: [_____] (required) —74 or

Account Number: [_____] (required) —75 or

Account Alias: [_____] (Option 1 only) —76

---

For Option 1 [ test TBD here ]

Environment#: [_____] —77

For Option 2 [ test TBD here ]

Account Invoice Type:   ⊙ VLI    ○ VCI  —78

Account Level:   ⊙ Corporate  ○ Billpayer  ○ Location  —79

71— [ Continue ]   [ Home ]

To present/view invoices
(direct to invoice if match,
otherwise, list returned)

IAT home

Notes
- Sales reps can only search by account criteria

NOTE:
- If you are already at an account and select 'view invoices' then you are taken directly into presentment to see the invoice.

- If you have NOT already drilled down to an account level, then this page appears to route you into the correct point in the presentment screens.

Footer test links and copyright/legal notice

FIG. 3C

90 ► The enrollment text:

This is to inform you that you have successfully enrolled the following customer(s) in MCIWorldComInteract(SM) E-Billing.

92 ─ "The new customer info goes here"

Please remind your customers that after 3 months of receiving an E-Bill they will no longer receive a paper invoice. If you would like to discontinue receiving this notification please visit http://www.interact.mciworldcom.com/e-billing <http://www.interact.mciworldcom.com/e-billing>, log in, and on the first page select the button to cancel future notifications.

If your responsibilities have changed and you would like to have your name removed from some or all of the above accounts please send an e-mail to ebill-help@mci.com <mailto:ebill-help@mci.com>.

Sincerely,
E-Billing Product Management

FIG. 4A

95 ► This is to inform you that a customer has elected to cancel their MCIWorldCom Interact(SM) E-Billing account. The following customer(s) have been cancelled and will no longer receive an E-Bill.

97 ─ "Customer Info Goes Here"

If you would like to discontinue receiving this notification please visit http://www.interact.mciworldcom.com/e-billing.
<http://www.interact.mciworldcom.com/e-billing>, log in, and on the first page select the radio button to cancel future notifications.

If your responsibilities have changed and you would like to have your name removed from some or all of the above accounts please send an e-mail to ebill-help@mci.com <mailto:ebill-help@mci.com>.

Sincerely,
E-Billing Product Management

FIG. 4B

ACCOUNT MANAGEMENT TOOL FOR E-BILLING SYSTEM

CROSS-REFERENCES TO RELATED APPLICATIONS

This application is related to, and claims the benefit of the earlier filing date of U.S. Provisional Patent Application No. 60/193,298 filed Mar. 30, 2000, entitled "Account Management Tool for E-billing System," the entirety of which is incorporated herein by reference.

BACKGROUND OF THE INVENTION

1. Field of the Invention

The present invention relates to e-commerce customer-support services, and particularly, to enhanced features for a web-based electronic billing system tool that provides internal sales representatives with updated customer e-billing account activity.

2. Discussion of the Background

Currently, there is no telecommunications enterprise or vendor providing telecommunications services that provide a fully integrated communications offering on the Internet with comprehensive product and services information, including electronic billing analysis and interactive customer support. In the area of billing for telecommunications products and services, telecommunications service enterprises provide capabilities for "on-line" electronic funds transfer (EFT) or public switched telephone network (PSTN) dial-up credit card payment of their invoices.

Existing comprehensive world-wide-web/Internet-based invoicing and payment systems (hereinafter "e-billing") enables customers to easily receive and analyze their invoices, and, in addition, enable customers to pay their invoices, electronically via electronic funds transfer. This "e-billing" system includes a comprehensive software and system infrastructure that provides a variety of tools for enabling customers of telecom companies to receive, analyze and pay their invoices by a variety of methods, via a single comprehensive interface.

It is becoming increasingly desirable to provide an internal Sales Representative of the telecommunications enterprise sales force with access to e-billing customer accounts so as to enable the sales force to better manage/track their e-billing customers.

SUMMARY OF THE INVENTION

The present invention addresses the above stated needs by providing an e-billing system that provides a sales representative with an account management tool that enables a company's sales force to better manage/track their e-billing customers. The account management tool permits a company's sales force to view all of their invoices and/or companies that are on e-billing.

According to one aspect of the invention, there is provided an account management methodology and system for sales representatives of an enterprise employing an e-billing system including a computer system accessible for on-line interactive communication of product and service invoices to users, said account management tool comprising: a database for storing customer account information including customer invoices, the customer information including information for associating a customer account with a particular sales representative; a mechanism for retrieving from the database a list of all customer accounts associated with the sales representative; and, a device for transmitting a list of customer accounts associated with the sales representative to a service representative browser device for display thereof, whereby customer account information associated with the sales representative is available for review. In a preferred embodiment, the account management methodology and system includes an e-mail notification feature enabling receipt of email notifying a sales representative that a customer has signed up for (or) has been deleted from e-billing. A sales representative is further provided with the ability to turn off/on this email notification.

According to another aspect of the present invention, a method for providing an on-line billing system is disclosed. The method includes storing account information of a plurality of customers in a database. The account information includes information for associating each of the plurality of customers with a particular agent among a plurality of agents. The method also includes generating a list of customer accounts corresponding to the particular agent from the account information, and displaying the list via a web browser to the agent.

According to another aspect of the present invention, a server apparatus for providing an on-line billing system is disclosed. The server apparatus includes a communication interface that is configured to retrieve account information of a plurality of customers in a database. The account information includes information for associating each of the plurality of customers with a particular agent among a plurality of agents. The server apparatus also includes a processor coupled to the communication interface and configured to generate a list of customer accounts corresponding to the particular agent from the account information, and to instruct display of the list via a web browser to the agent.

In yet another aspect of the present invention, an e-billing system is provided. The e-billing system includes a database that is configured to store account information of a plurality of customers in a database. The account information includes information for associating each of the plurality of customers with a particular agent among a plurality of agents. The system also includes a server that communicates with the database. The server is configured to generate a list of customer accounts corresponding to the particular agent from the account information, and to instruct display of the list via a web browser to the agent. Further, the system includes a client that communicates with the server. The client is configured to run the web browser to display the list.

According to yet another aspect of the present invention, a server apparatus for providing an on-line billing system is disclosed. The server apparatus includes means for storing account information of a plurality of customers in a database. The account information includes information for associating each of the plurality of customers with a particular agent among a plurality of agents; means for generating a list of customer accounts corresponding to the particular agent from the account information; and means for displaying the list via a web browser to the agent.

In yet another aspect of the present invention, a computer-readable medium carrying one or more sequences of one or more instructions for providing an on-line billing system is disclosed. The one or more sequences of one or more instructions including instructions which, when executed by one or more processors, cause the one or more processors to perform the step of storing account information of a plurality of customers in a database. The account information includes information for associating each of the plurality of customers with a particular agent among a plurality of agents. Other steps include generating a list of customer accounts corresponding to the particular agent from the account information, and displaying the list via a web browser to the agent.

Advantageously, the account management tool of the invention provides timely updated information relating to the customer base of a sales representative, thus stimulating the use of more e-billing and EFT payments, and consequently reducing a company's outstanding accounts receivables.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 3(a), 3(b), 3(c) and 3(d) are diagrams of exemplary web-based display screens associated with the account management tool functionality, according to an embodiment of the present invention;

FIGS. 4(a) and 4(b) are diagrams of exemplary e-mail notification messages communicated to a sales representative when a new customer has enrolled for e-billing, and when a customer has been deleted from the e-billing system, respectively, according to an embodiment of the present invention.

DESCRIPTION OF THE PREFERRED EMBODIMENTS

In the following description, for the purpose of explanation, specific details are set forth in order to provide a thorough understanding of the invention. However, it will be apparent that the invention may be practiced without these specific details. In some instances, well-known structures and devices are depicted in block diagram form in order to avoid unnecessarily obscuring the invention.

Although the present invention is discussed with respect to an Internet-based billing system, it is recognized that the present invention has applicability to any packet switched network.

Figure 1:
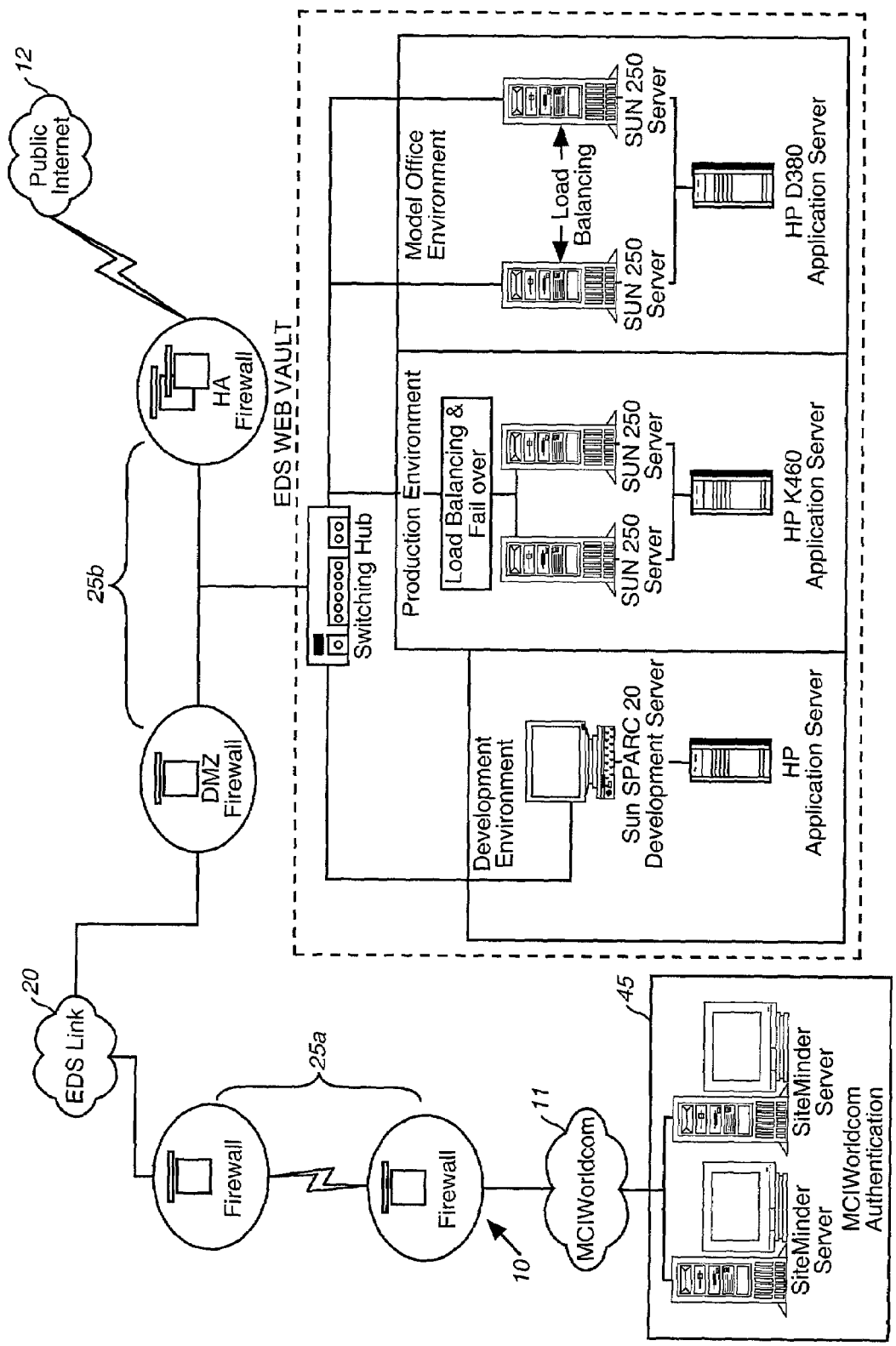
FIG. 1 is a diagram of an e-billing system architecture employing an account management tool to provide sales representative with enhancement features, in accordance with an embodiment of the present invention.

As shown in FIG. 1, there is depicted a physical hardware architecture of an exemplary e-billing system 10 (e.g., the MCIWorldcom Interact system). As shown in FIG. 1, there is provided a billing system represented as cloud 11. Relating specifically to e-billing, a link via a double firewall 25a is provided to interface the billing system 10 with a third-party vendor electronic bill statement and presentment system 20 that functions to generate and present on-line billing invoices for customers of the telecommunications enterprise over the Internet via double firewall 25b. In operation, a file including a customer's billing/invoice data is provided by the billing system (e.g., accounts receivable department) to the third-party system 20 where web-pages including corresponding versions of the customer invoices are generated and posted online. Customers initially do not have access to the web based invoices. Instead, the on-line invoices are available to the enterprise audit department which checks the invoices for format compliance and billing total amount accuracy. As soon as the on-line versions of the invoices are approved by the audit department, they are flagged as available on-line and the third party system 20 notifies the customer and posts the invoices on-line for the customer access. Via public Internet 12 access through the MCI "Interact" web server portal to the suite of web-based applications including the e-billing application (not shown), the customer's may pay their invoices.

Further, the e-billing system 10 includes an Internal Administration Tool (IAT) (not shown) which enables internal users (internal to the enterprise) to enable internal users to search for, add, view, modify, and delete users for various customer accounts. The IAT enables any enterprise personnel to view invoices by logging on as a particular external user or by specifying account invoice criteria. The user types include: Administrators, i.e., users with full functionality to the IAT, with the ability to maintain all levels of access, e.g., usually those personnel of high level authority or personnel responsible for e-billing system maintenance; and, Customer Service Representative (CSR), i.e., users with access to the IAT, but may be restricted from making certain changes, e.g. Order Entry, Customer Service, or Customer Center personnel.

Figure 2:
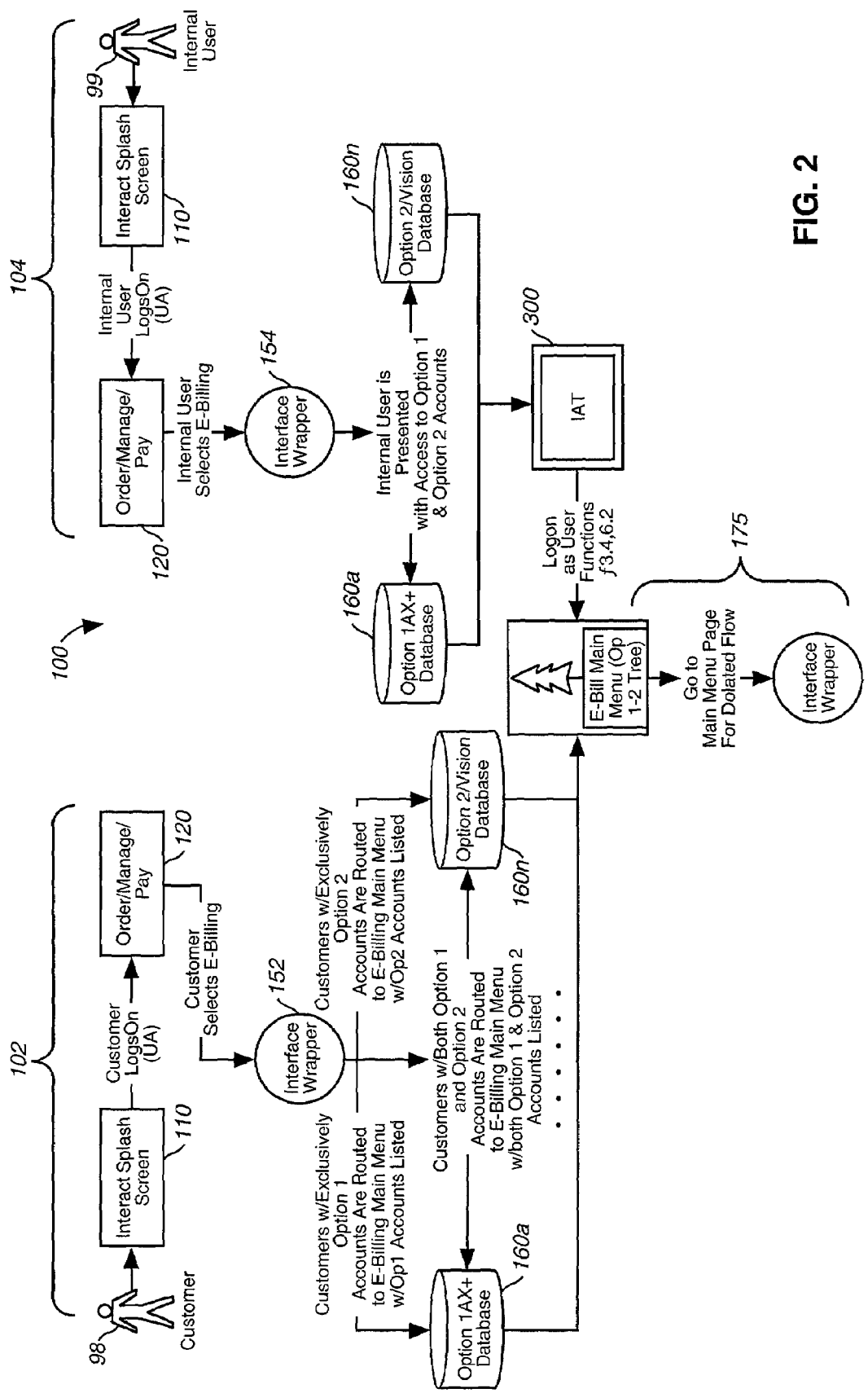
FIG. 2 is a diagram of an e-billing software architecture incorporating an account management tool, according to an embodiment of the present invention.

FIG. 2 illustrates conceptually the e-billing software architecture 100 incorporating the internal account management tool providing the sales representative enhancement feature of the invention. As shown in FIG. 2, the system is divided into two functional areas: a first customer application 102 for providing customers 98 with access to the e-billing system; and a second application 104 for providing internal users 99 with access to the e-billing system. Particularly, for each application 102, 104, the software enables the generation of a "Splash Screen" 110, which is the initial screen that is displayed upon entering the system. Via the "Splash Screen" 110, a customer 98 first enters a password and/or UserID (user identification) to log on to the Interact System. In an exemplary embodiment, a universal authentication process is initiated for authorizing the customer access to the e-billing system.

After the authentication process, the customer is provided with a display 120 that enables the customer to select the e-billing system option. Likewise, via the "Splash Screen" 110, an internal user, such as a sales representative 99 may enter a password and/or UserID in order to log on to the Interact System. After the internal user id is verified and access is authorized, the internal user is provided with a display 120 that enables the user to select the e-billing system option. For each of the customer and internal user applications 102, 104 respectively, there is implemented respective "interface wrappers" 152, 154, which provide a common "look and feel" regardless if the user is a customer or a user. For instance, as shown in FIG. 1, depending upon who the customer is and his/her access privileges, the interface wrapper 152 will enable those customer accounts to be listed for the customer via a web-based e-billing main menu display and make those accounts available for access by the customer via a web-browser or other suitable web-based interface device. Likewise, depending upon the access privileges of the internal user, the interface wrapper 154 will enable those accounts to be listed for the internal user via a web-based e-billing main menu display and, further make those accounts available for access by the user via a web-browser or other suitable web-based interface device.

As shown in FIG. 2, all customer account information is stored in one or more databases 160a, . . . , 160n depending upon factors including who the customer is, the type of networks the customer is using/managing, the account type, etc. For purposes of explanation, these databases 160a, . . . , 160n may be lumped into one database, and may centrally located or distributed. However implemented, all account information stored in the database is filtered, by the interface wrappers 152, 154 in order to provide the appropriate account information to the authorized requestor (customer/user). Regardless of who is accessing the e-billing system, a main menu option page 175 is displayed for the customer/user to invoke the e-billing system functions including the enhanced Sales Representative functionality. As further shown in FIG. 2, however, the internal user application 104 is provided with the e-billing system Internal Administration Tool 300, which includes an account and user maintenance engines for enabling internal users to add, view, and modify User and Account information for all of their accounts.

With respect to the internal Sales Representative (hereinafter "SR"), the IAT 300 preferably enables specialized functionality for enabling the viewing of associated accounts, searching for accounts, viewing of account invoices, and receiving/setting various E-mail notifications, as will be explained in greater detail.

Figure 3A:
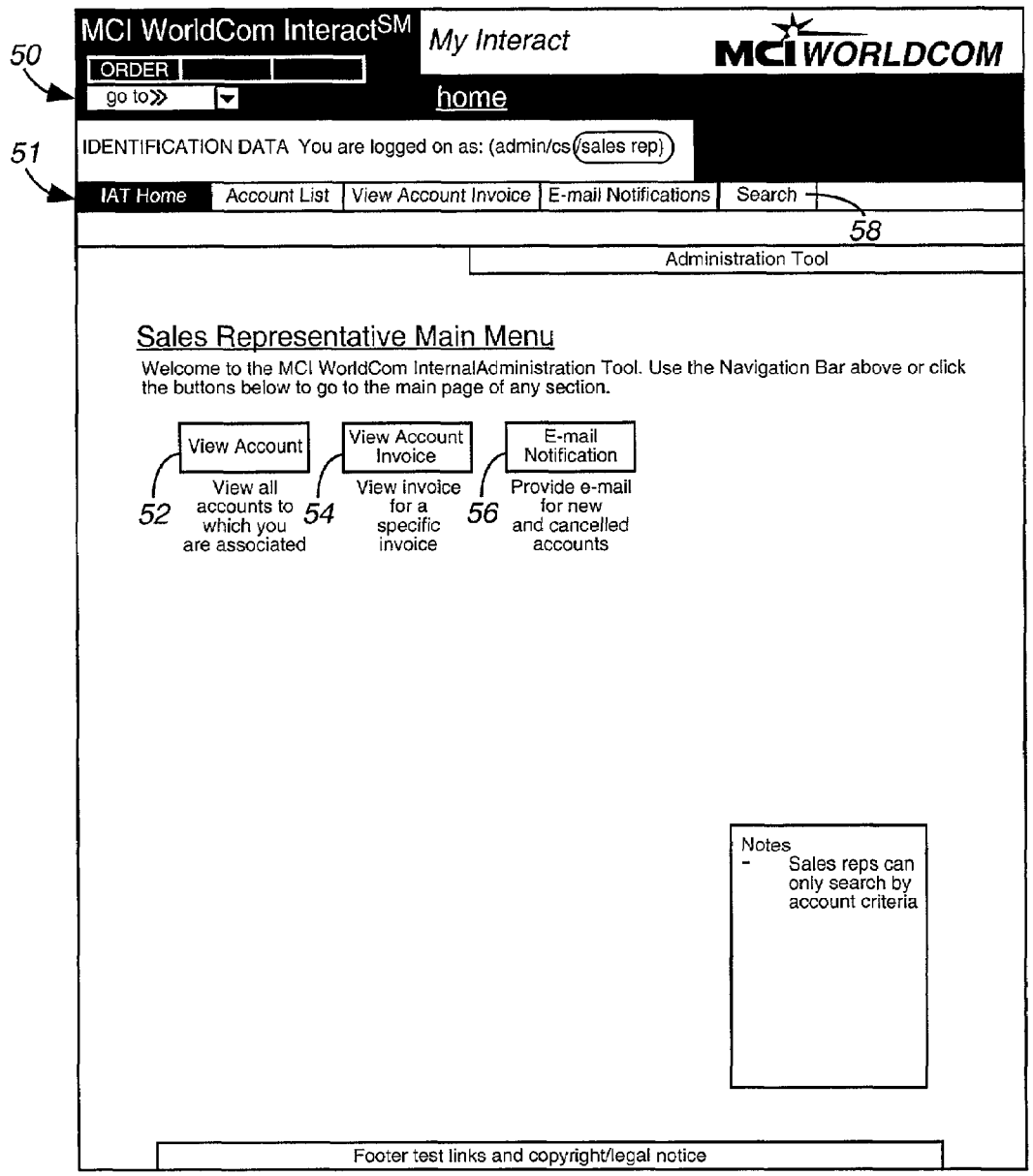

As part of this functionality, upon log on and authentication as an agent (i.e., Sales Representative (SR)), a Sales Representative Home Page 50 is generated for download to the SR user browser as shown in the example home page depicted in FIG. 3(a). As depicted in FIG. 3(a), the SR home page 50 is provided with main menu option choices including: a first link 52 to an account list for providing the SR with the ability to view all accounts to which that SR is associated; a second link 54 for providing the SR with the ability to access a specific account invoice or view a specific account invoice through the SR view account list; and, a third link 56 for providing the SR with the ability to set provisions within the e-billing system enabling the SR to receive an e-mail notification each time an e-billing account is associated to that SR's user id, and enabling the SR to receive an e-mail notification each time an account that is associated to that SR's user id becomes deleted. It is understood that the SR home page 50 includes a task bar 51 from which an SR may select to link to the various IAT functions. One of these functions include the search link 58 which enables the SR to search by account name or account number for different types of accounts and, additionally providing the ability to access those account invoices that resulted from the search.

Figure 3B:
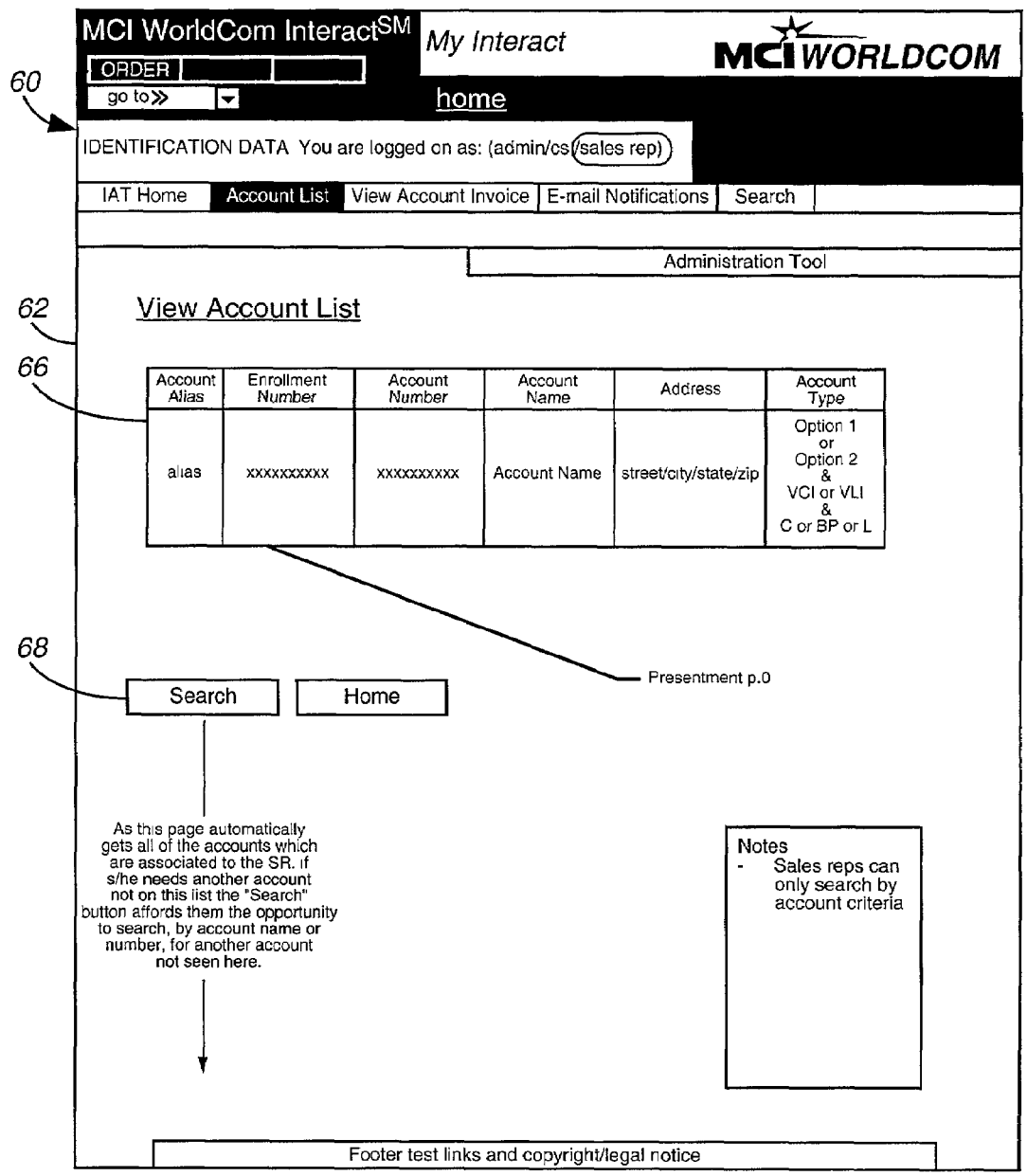

As shown in FIG. 3(a), when the SR selects view account list link 52, the internal SR user is presented with a web based display screen 60, an example of which is depicted in FIG. 3(b), having a frame 62 automatically populated with all of the accounts 66 associated with that SR. The internal SR user will thus be able to view all of the account list results 66 for that SR. Account information provided in the list results include Account name, number, account address, account type, level, environment number and account alias. From this web page display 60, a further link 68 is provided for enabling a user to conduct a further search for other accounts not listed.

Figure 3D:
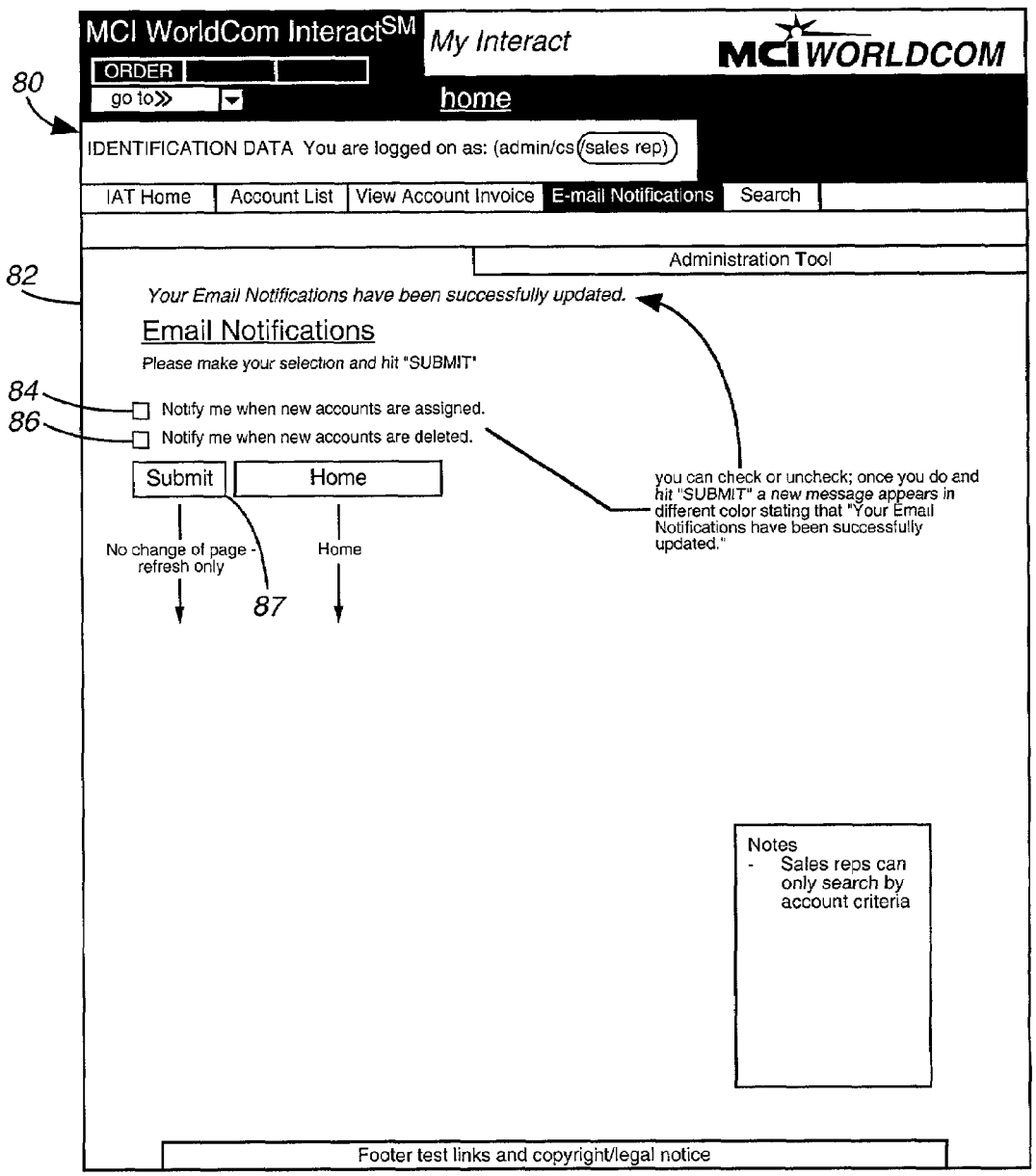

Referring back to FIG. 3(a), when the SR selects view account invoice link 54, the internal SR user is presented with a web based display screen 70, an example of which is depicted in FIG. 3(c), having a frame 72 providing entry fields for entering account invoice search criteria, it should be understood that a similar web based display screen as shown in FIG. 3(c) is presented to the SR user upon selection of the search button 58 shown in the home page display of FIG. 3(a). Returning to FIG. 3(c), for example, there is provided in frame 72 entry fields 74, 75 and 76 for enabling the SR to enter an account name and account number or an account alias, respectively, according to the desired account invoice, which the SR desires for viewing. A further entry field 77 is provided for enabling entry of an environment number and further radio buttons 78 and 79 are provided for enabling the SR user to select account invoice type, e.g., VLI, and the account level, e.g., corporate. In response to selection of the continue button 71, a search is conducted for the SR entered criteria, and a view account invoice search results list similar to the list such as depicted in the example of FIG. 3(b) is presented to the SR. From this list, a user may click on the desired account id from the list 68 to enable viewing of those account invoice (5) for that account which resulted from the search. Thus, the SR account invoice information may be retrieved by entering an account name, account number or account alias. If the SR is within an account and then chooses to view invoices, they are taken directly into that account's invoice. As shown in FIG. 3(a), when the SR selects the e-mail notification link 56, the internal SR user is presented with a web based display screen 80, an example of which is depicted in FIG. 3(d), having a frame 82 with a check box 84 enabling the SR to specify whether the SR would like to receive an e-mail notification from the e-billing system 10 (FIG. 1) each time an e-billing account associated to that SR's user id is assigned; and, a check box 86 enabling the SR to specify whether the SR would like to receive an e-mail notification from the e-billing system each time an e-billing account associated to that SR's user id is deleted. After making the various selection, the SR clicks the Submit button 87 to effectuate the e-mail notification.

FIG. 4(a) illustrates an example e-mail message 90 automatically generated by the e-billing system and transmitted for receipt by the SR when that SR's status indicates e-mail notification from the e-billing system 10 for newly enrolled e-Billing account customers associated to that SR's user id. As shown in FIG. 4(a), the example e-mail message is automatically populated with the new customer account information 90, i.e., customer account name, address, and the like, for the associated SR.

FIG. 4(b) illustrates an example e-mail message 95 automatically generated by the e-billing system and transmitted for receipt by the SR when that SR's status indicates e-mail notification from the e-billing system 10 for e-billing account customers who have terminated their accounts or whose accounts have been terminated. As shown in FIG. 4(b), the example email message is automatically populated with the canceled customer account information 97, i.e., account name, address, and the like, for the associated SR.

Figure 5:
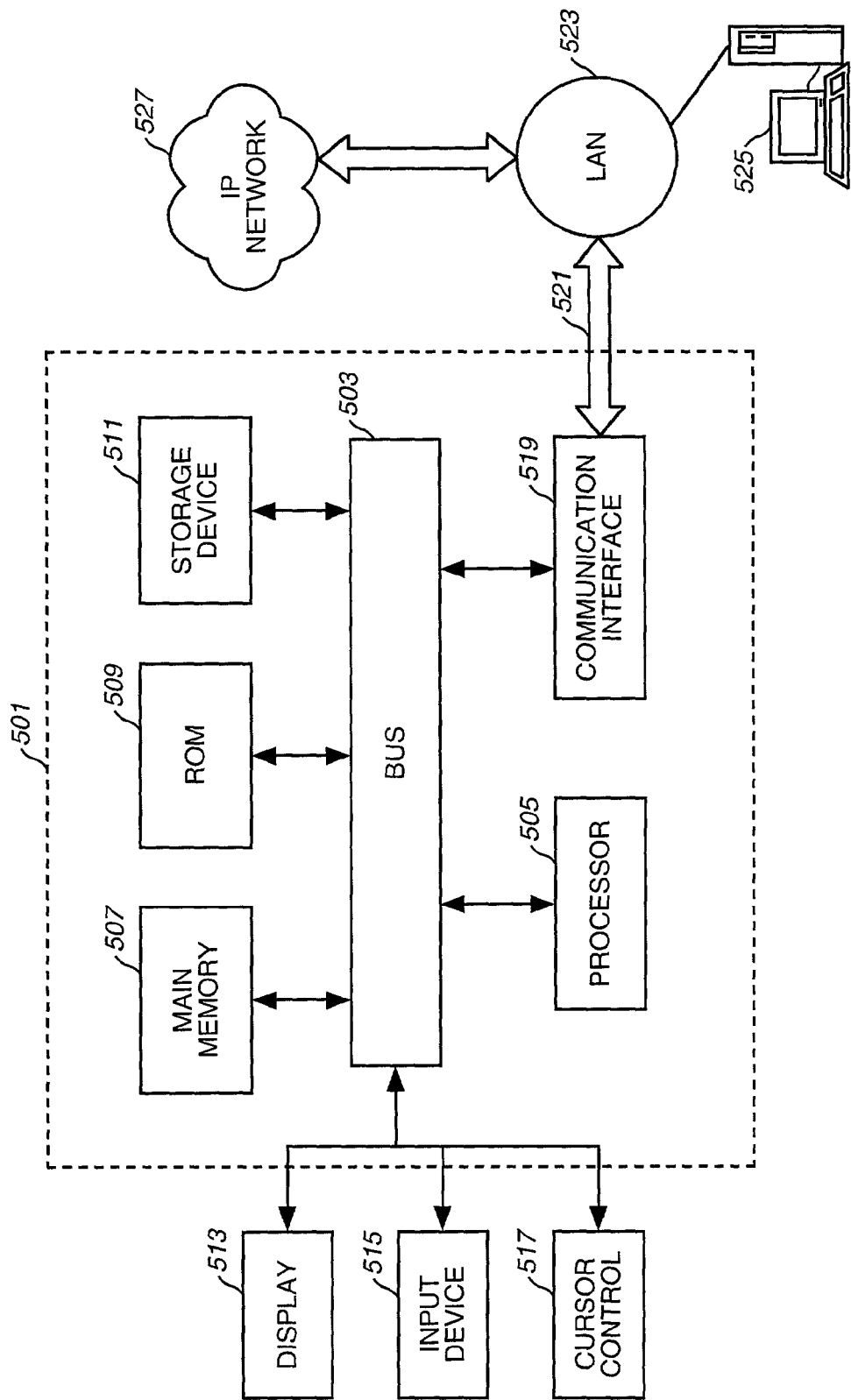
FIG. 5 is a diagram of a computer system that performs in accordance with an embodiment of the present invention.

FIG. 5 illustrates a computer system upon which an embodiment according to the present invention may be implemented. Computer system 501 includes a bus 503 or other communication mechanism for communicating information, and a processor 505 coupled with bus 503 for processing the information. Computer system 501 also includes a main memory 507, such as a random access memory (RAM) or other dynamic storage device, coupled to bus 503 for storing information and instructions to be executed by processor 505. In addition, main memory 507 may be used for storing temporary variables or other intermediate information during execution of instructions to be executed by processor 505. Computer system 501 further includes a read only memory (ROM) 509 or other static storage device coupled to bus 503 for storing static information and instructions for processor 505. A storage device 511, such as a magnetic disk or optical disk, is provided and coupled to bus 503 for storing information and instructions.

Computer system 501 may be coupled via bus 503 to a display 513, such as a cathode ray tube (CRT), for displaying information to a computer user. An input device 515, including alphanumeric and other keys, is coupled to bus 503 for communicating information and command selections to processor 505. Another type of user input device is cursor control 517, such as a mouse, a trackball, or cursor direction keys for communicating direction information and command selections to processor 505 and for controlling cursor movement on display 513.

According to one embodiment, the e-billing functions are provided by computer system 501 in response to processor 505 executing one or more sequences of one or more instructions contained in main memory 507. Such instructions may be read into main memory 507 from another computer-readable medium, such as storage device 511. Execution of the sequences of instructions contained in main memory 507 causes processor 505 to perform the process steps described herein. One or more processors in a multi-processing arrangement may also be employed to execute the sequences of instructions contained in main memory 507. In alternative embodiments, hard-wired circuitry may be used in place of or in combination with software instructions. Thus, embodiments are not limited to any specific combination of hardware circuitry and software.

Further, the functions of the e-billing system may reside on a computer-readable medium. The term "computer-readable medium" as used herein refers to any medium that participates in providing instructions to processor 505 for execution. Such a medium may take many forms, including but not limited to, non-volatile media, volatile media, and transmission media. Nonvolatile media includes, for example, optical or magnetic disks, such as storage device 511. Volatile media includes dynamic memory, such as main memory 507. Transmission media includes coaxial cables, copper wire and fiber optics, including the wires that comprise bus 503. Transmission media can also take the form of acoustic or light waves, such as those generated during radio wave and infrared data communication.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 505 for execution. For example, the instructions may initially be carried on a magnetic disk of a remote computer. The remote computer can load the instructions relating to e-billing functions remotely into its dynamic memory and send the instructions over a telephone line using a modem. A modem local to computer system 501 can receive the data on the telephone line and use an infrared transmitter to convert the data to an infrared signal. An infrared detector coupled to bus 503 can receive the data carried in the infrared signal and place the data on bus 503. Bus 503 carries the data to main memory 507, from which processor 505 retrieves and executes the instructions. The instructions received by main memory 507 may optionally be stored on storage device 511 either before or after execution by processor 505.

Computer system 501 also includes a communication interface 519 coupled to bus 503. Communication interface 519 provides a two-way data communication coupling to a network link 521 that is connected to a local network 523. For example, communication interface 519 may be a network interface card to attach to any packet switched local area network (LAN). As another example, communication interface 519 may be an asymmetrical digital subscriber line (ADSL) card, an integrated services digital network (ISDN) card or a modem to provide a data communication connection to a corresponding type of telephone line. Wireless links may also be implemented. In any such implementation, communication interface 519 sends and receives electrical, electromagnetic or optical signals that carry digital data streams representing various types of information.

Network link 521 typically provides data communication through one or more networks to other data devices. For example, network link 521 may provide a connection through local network 523 to a host computer 525 or to data equipment operated by a service provider, which provides data communication services through a communication network 527 (e.g., the Internet). LAN 523 and network 527 both use electrical, electromagnetic or optical signals that carry digital data streams. The signals through the various networks and the signals on network link 521 and through communication interface 519, which carry the digital data to and from computer system 501, are exemplary forms of carrier waves transporting the information. Computer system 501 can transmit notifications and receive data, including program code, through the network(s), network link 521 and communication interface 519.

The techniques described herein provide several advantages over prior approaches to executing payment of bills over an on-line system. The e-mail-related functionality and the ability for the agent (e.g., Sales Representative) to control the receipt of the email as afforded by the invention is particularly valuable to the sales force of any service enterprise employing e-billing systems to help them better manage/track their e-billing customers. The present invention advantageously equips the Sales Representative with greater access to account information and more timely information related to the customer base of the Sales Representative, thus fostering more e-billing to provide timely and efficient processing of bills.

While the invention has been particularly shown and described with respect to preferred embodiments thereof, it will be understood by those skilled in the art that the foregoing and other changes in form and details may be made therein without departing from the spirit and scope of the invention. More specifically, the system administrative and early payment discount system described may apply to any generic applications available via the Web and is not limited to the telecommunications industry.

What is claimed is:

1. A method for providing an on-line billing system, the method comprising:

storing account information of a plurality of customers in a database, the account information including information for associating each of the plurality of customers with a particular agent among a plurality of agents;

generating a list of customer accounts corresponding to the particular agent from the account information;

displaying the list via a web browser to the particular agent;

detecting an event that changes an association between one of the customers and the particular agent;

determining whether the particular agent has enabled notification of account changes; and in response to detecting the event and determining that the particular agent has enabled notification of account changes, generating an electronic mail message describing the event and sending the electronic mail message to the particular agent.

2. The method according to claim 1, further comprising:
drilling down to view a particular customer invoice associated with a particular customer account selected from the list.

3. The method according to claim 1, wherein the event includes a new enrollment of the one of the customers or an account cancellation of the one of the customers.

4. The method according to claim 1, further comprising:
displaying at least one option to the particular agent for selectively enabling or disabling the notification of account changes.

5. The method according to claim 1, wherein the customer account in the storing step is associated with a user identification of the particular agent.

6. A server apparatus for providing an on-line billing system, the server apparatus comprising:
a communication interface configured to retrieve account information of a plurality of customers in a database, the account information including information for associating each of the plurality of customers with a particular agent among a plurality of agents; and
a processor coupled to the communication interface and configured to generate a list of customer accounts corresponding to the particular agent from the account information,
instruct display of the list via a web browser to the particular agent,
detect an event that changes an association between one of the customers and the particular agent,
determine whether the particular agent has enabled notification of account changes, and
generate an electronic mail message describing the event and send the electronic mail message to the particular agent, in response to detecting the event and determining that the particular agent has enabled notification of account changes.

7. The server apparatus according to claim 6, wherein the processor is configured to drill down to view a particular customer invoice associated with a particular customer account selected from the list.

8. The server apparatus according to claim 6, wherein the event includes a new enrollment of the one of the customers or an account cancellation of the one of the customers.

9. The server apparatus according to claim 6, wherein the processor is configured to display at least one option to the particular agent for selectively enabling or disabling the notification of account changes.

10. The server apparatus according to claim 6, wherein the customer account is associated with a user identification of the particular agent.

11. An e-billing system comprising:
a database configured to store account information of a plurality of customers in a database, the account information including information for associating each of the plurality of customers with a particular agent among a plurality of agents;
a server communicating with the database, the server being configured to generate a list of customer accounts corresponding to the particular agent from the account information,
instruct display of the list via a web browser to the particular agent,
detect an event that changes an association between one of the customers and the particular agent,
determine whether the particular agent has enabled notification of account changes, and
generate an electronic mail message describing the event and send the electronic mail message to the particular agent, in response to detecting the event and determining that the particular agent has enabled notification of account changes; and
a client communicating with the server, the client being configured to run the web browser to display the list.

12. The system according to claim 11, wherein the server is configured to drill down to view a particular customer invoice associated with a particular customer account selected from the list.

13. The system according to claim 11, wherein the event includes a new enrollment of the one of the customers or an account cancellation of the one of the customers.

14. The system according to claim 11, wherein the server is configured to instruct display of at least one option to the particular agent for selectively enabling or disabling the notification of account changes.

15. The system according to claim 11, wherein the customer account is associated with a user identification of the particular agent.

16. A server apparatus for providing an on-line billing system, the server apparatus comprising:
means for storing account information of a plurality of customers in a database, the account information including information for associating each of the plurality of customers with a particular agent among a plurality of agents;
means for generating a list of customer accounts corresponding to the particular agent from the account information;
means for displaying the list via a web browser to the particular agent;
means for detecting an event that changes an association between one of the customers and the particular agent;
means for determining whether the particular agent has enabled notification of account changes; and
means for generating an electronic mail message describing the event and sending the electronic mail message to the particular agent, in response to detecting the event and determining that the particular agent has enabled notification of account changes.

17. The server apparatus according to claim 16, further comprising:
means for drilling down to view a particular customer invoice associated with a particular customer account selected from the list.

18. The server apparatus according to claim 16, wherein the event includes a new enrollment of the one of the customers or an account cancellation of the one of the customers.

19. The server apparatus according to claim 16, further comprising:
means for displaying at least one option to the particular agent for selectively enabling or disabling the notification of account changes.

20. The server apparatus according to claim 16, wherein the customer account is associated with a user identification of the particular agent.

21. A computer-readable medium carrying one or more sequences of one or more instructions for providing an on-line billing system, the one or more sequences of one or more instructions including instructions which, when executed by one or more processors, cause the one or more processors to perform the steps of:

storing account information of a plurality of customers in a database, the account information including information for associating each of the plurality of customers with a particular agent among a plurality of agents;

generating a list of customer accounts corresponding to the particular agent from the account information;

displaying the list via a web browser to the particular agent;

detecting an event that changes an association between one of the customers and the particular agent;

determining whether the particular agent has enabled notification of account changes; and in response to detecting the event and determining that the particular agent has enabled notification of account changes, generating an electronic mail message describing the event and sending the electronic mail message to the particular agent.

22. The computer-readable medium according to claim 21, wherein the one or more processors further perform the step of:

drilling down to view a particular customer invoice associated with a particular customer account selected from the list.

23. The computer-readable medium according to claim 21, wherein the event includes a new enrollment of the one of the customers or an account cancellation of the one of the customers.

24. The computer-readable medium according to claim 21, wherein the one or more processors further perform the step of:

displaying at least one option to the particular agent for selectively enabling or disabling the notification of account changes.

25. The computer-readable medium according to claim 21, wherein the customer account in the storing step is associated with a user identification of the particular agent.

26. An account management tool for sales representatives of an enterprise employing an e-billing system including a computer system accessible for on-line interactive communication of product and service invoices to users, the account management tool comprising:

a database for storing customer account information including customer invoices, the customer information including information for associating a customer account with a particular sales representative;

a mechanism for retrieving from the database a list of all customer accounts associated with the particular sales representative;

a device for transmitting a list of the customer accounts associated with the particular sales representative to a sales representative browser device for display thereof, whereby customer account information associated with the particular sales representative is available for review;

a mechanism for detecting an event that changes an association between one of the customers and the particular sales representative;

a mechanism for determining whether the particular sales representative has enabled notification of account changes; and a mechanism for generating an electronic mail message describing the event and sending the electronic mail message to the particular sales representative, in response to detecting the event and determining that the particular sales representative has enabled notification of account changes.

27. The account management tool according to claim 26, further including:

a drill-down mechanism for enabling viewing of a particular customer invoice associated with a particular customer account selected from the customer account list.

28. The account management tool according to claim 26, wherein the event includes enrollment by a new customer for e-billing.

29. The account management tool according to claim 26, wherein the event includes cancellation of an e-billing enrollment by the one of the customers.

30. The account management tool according to claim 26, further including a mechanism for enabling a sales representative to enable or disable the notification of account changes.

31. The account management tool according to claim 26, wherein the customer account is associated with a user ID of the sales representative and recognized by the e-billing system.

32. A method for tracking customers enrolled in an e-billing system employed by an enterprise, the e-billing system including a computer system accessible for online interactive communication of product and service invoices to customers, the method comprising:

tracking enrolled customers and associated customer account information, and storing customer account information including customer invoices of the enrolled customers in a database, associating enrolled customers with a particular sales representative of the enterprise;

retrieving from the database a list of all customer accounts associated with the particular sales representative;

transmitting a list of the customer accounts associated with the particular sales representative to a sales representative browser device for display thereof, whereby customer account information associated with the particular sales representative is available for review by the particular sales representative;

detecting an event that changes an association between one of the customers and the particular sales representative;

determining whether the particular sales representative has enabled notification of customer account changes; and in response to detecting the event and determining that the particular sales representative has enabled notification of customer account changes, generating an electronic mail message describing the event and sending the electronic mail message to the particular sales representative.

33. The method according to claim 32, wherein the event includes a new enrollment in the e-billing system by the one of the customers.

34. The method according to claim 32, wherein the event includes a deletion of the one of the customers from the e-billing system.

* * * * *